(12) United States Patent
Hattori et al.

(10) Patent No.: US 7,417,826 B2
(45) Date of Patent: Aug. 26, 2008

(54) MAGNETIC RECORDING MEDIUM

(75) Inventors: Kazuhiro Hattori, Chuo-ku (JP);
Shuichi Okawa, Chuo-ku (JP);
Katsuyuki Nakada, Chuo-ku (JP)

(73) Assignee: TDK Corporation, Tokyo (JP)

( * ) Notice: Subject to any disclaimer, the term of this patent is extended or adjusted under 35 U.S.C. 154(b) by 486 days.

(21) Appl. No.: 10/805,354

(22) Filed: Mar. 22, 2004

(65) Prior Publication Data

US 2004/0191464 A1     Sep. 30, 2004

(30) Foreign Application Priority Data

Mar. 26, 2003     (JP)     ............................. 2003-086020

(51) Int. Cl.
*G11B 5/714*     (2006.01)

(52) U.S. Cl. .................................... 360/135

(58) Field of Classification Search ................ 360/135, 360/131

See application file for complete search history.

(56) References Cited

U.S. PATENT DOCUMENTS 6,088,200 A     7/2000     Morita ........................ 360/135
6,313,969 B1     11/2001     Hattori et al. ............... 360/135
2003/0072971 A1     4/2003     Fukutani et al. ............. 428/819

FOREIGN PATENT DOCUMENTS

| JP | 57-3228 A | * | 1/1982 |
| JP | A 4-368609 | | 12/1992 |
| JP | A 6-195907 | | 7/1994 |
| JP | A 8-203058 | | 8/1996 |
| JP | A-2000-306227 | | 11/2000 |
| JP | A 2002-359138 | | 12/2002 |
| WO | WO 01/43122 A2 | | 6/2001 |

OTHER PUBLICATIONS

Albrecht et al., "Magnetic coercivity patterns for magnetic recording on patterned media," Applied Physics Letters, vol. 83, No. 21, Nov. 24, 2003 pp. 4363-4365.

* cited by examiner

*Primary Examiner*—Julie Anne Watko
(74) *Attorney, Agent, or Firm*—Oliff & Berridge, PLC

(57) ABSTRACT

A magnetic recording medium on which servo information is recorded efficiently with a sufficient output amplitude for favorable read accuracy of the servo information. In servo areas, a magnetic layer is separated into a plurality of servo pattern unit parts forming a predetermined servo pattern and servo pattern peripheral parts/part surrounding the servo pattern unit parts. The servo pattern unit parts and the servo pattern peripheral parts/part are formed in different sizes so as to have different magnetic properties.

16 Claims, 10 Drawing Sheets

Fig. 12
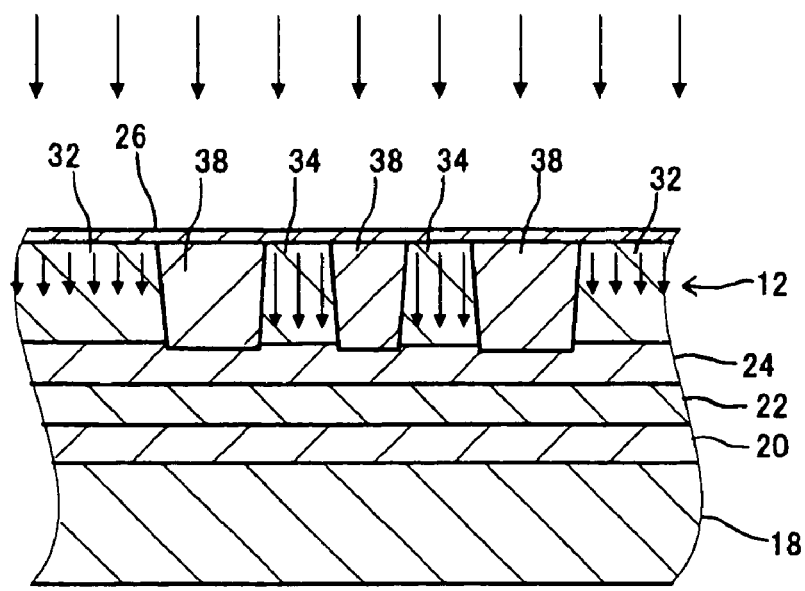
Fig. 13
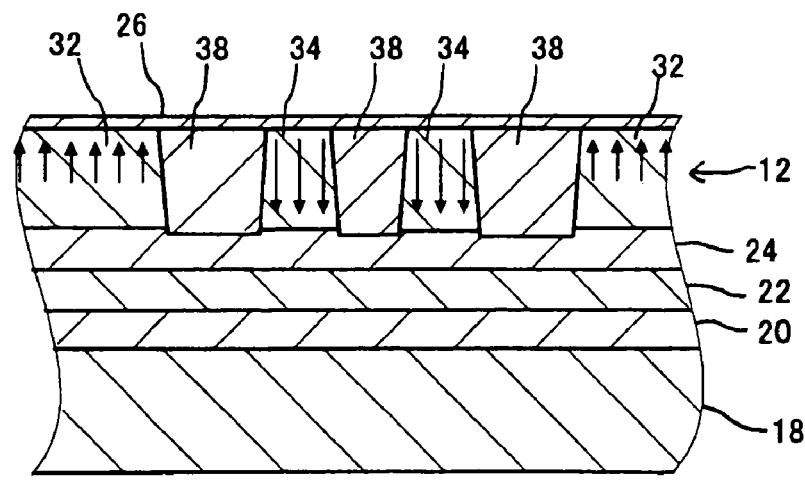

MAGNETIC RECORDING MEDIUM

BACKGROUND OF THE INVENTION

1. Field of the Invention

The present invention relates to a magnetic recording medium and a method of manufacturing a magnetic recording medium.

2. Description of the Related Art

Conventionally, magnetic recording media such as a hard disc have magnetic layer which is sectioned into a plurality of data areas and a plurality of servo areas for information recording. Servo information intended for control such as head positioning is magnetically recorded on the servo areas in a predetermined servo pattern.

The process of recording the servo information has a problem of low productivity since servo pattern parts of the servo areas and the peripheral parts thereof are magnetized in opposite polarities one by one for every magnetic recording medium by a servo track writing method. In particular, with a recent improvement in surface recording density and an accompanying decrease in head flying height, high-density high-precision recording has also been required of the servo information. This means an increasing need for an improvement to the recording efficiency of the servo information.

In view of this, there have been proposed magnetic recording media in which the magnetic layer is formed only in either ones of the servo pattern parts and the peripheral parts so that a servo pattern is formed physically (for example, see Japanese Patent Laid-Open Publication No. H 6-195907). In this case, a direct-current magnetic field can be uniformly applied to the magnetic recording medium to magnetize the magnetic layer to the servo pattern, with a significant improvement in the recording efficiency of the servo information.

Nevertheless, when the magnetic layer is formed only in either ones of the servo pattern parts and the peripheral parts, it is either the servo pattern parts or the peripheral parts alone that can be magnetized. This produces the problem that the output amplitude shrinks by half or so as compared to conventional magnetic recording media in which the servo pattern parts and the peripheral parts are magnetized in opposite polarities, with a drop in the read accuracy of the servo information.

SUMMARY OF THE INVENTION

In view of the foregoing problem, various exemplary embodiments of this invention provide a magnetic recording medium on which servo information can be recorded effectively with a sufficient output amplitude for favorable read accuracy of the servo information.

Further more, various exemplary embodiments of the invention provide a method of manufacturing such a magnetic recording medium. Various exemplary embodiments of the invention solved the foregoing problem by: separating a magnetic layer into servo pattern unit parts and servo pattern peripheral part/parts physically; and forming the servo pattern unit parts and the servo pattern peripheral part/parts in different sizes so as to have different magnetic properties.

In the process of achieving the present invention, the inventors have tried to process magnetic layers into various shapes, and noticed that the magnetic layers vary in magnetic properties with their physical sizes. One example of the findings is that magnetic layers tend to show significant increases in coercivity at sizes below approximately several hundreds of nanometers.

Thus, when the servo pattern unit parts and the servo pattern peripheral part/parts are formed in different sizes so as to have different magnetic properties, they can be distinguished based on the differences in magnetic properties. Besides, the servo pattern unit parts and the servo pattern peripheral part/parts both can be magnetized to cause a sufficient output amplitude.

As above, based on the findings totally different from the prior art, various exemplary embodiments of the invention is configured in a manner such that the servo pattern parts in the servo areas of the magnetic layer and the peripheral part/parts thereof are provided with magnetic elements of different sizes, thereby distinguishing the two parts based on differences in magnetic property. This configuration is totally different from the prior art of distinguishing servo pattern parts and peripheral parts depending on the presence or absence of magnetic elements.

Accordingly, various exemplary embodiments of the invention provide

A magnetic recording medium comprising a magnetic layer which is sectioned into a plurality of data areas and a plurality of servo areas for information recording, wherein:

in each of the servo areas, the magnetic layer is separated into a plurality of servo pattern unit parts forming a predetermined servo pattern and a servo pattern peripheral part/servo pattern peripheral parts surrounding the servo pattern unit parts; and the servo pattern unit parts and the servo pattern peripheral part/parts are formed in different sizes so as to have different magnetic properties.

A method of manufacturing a magnetic recording medium, comprising:

a magnetic layer forming step of forming a uniform magnetic layer on a substrate; and a magnetic layer processing step of separating a servo area of the magnetic layer into a plurality of servo pattern unit parts forming a predetermined servo pattern and a servo pattern peripheral part/servo pattern peripheral parts surrounding the servo pattern unit parts.

BRIEF DESCRIPTION OF THE DRAWINGS

FIG. 12 is a sectional side view schematically showing the step of applying a first external magnetic field to the magnetic recording medium;

FIG. 13 is a sectional side view schematically showing the step of applying a second external magnetic field to the magnetic recording medium;

DETAILED DESCRIPTION OF THE PREFERRED EMBODIMENT

Hereinafter, a preferable exemplary embodiment of the invention will be described in detail with reference to the drawings.

Figure 1:
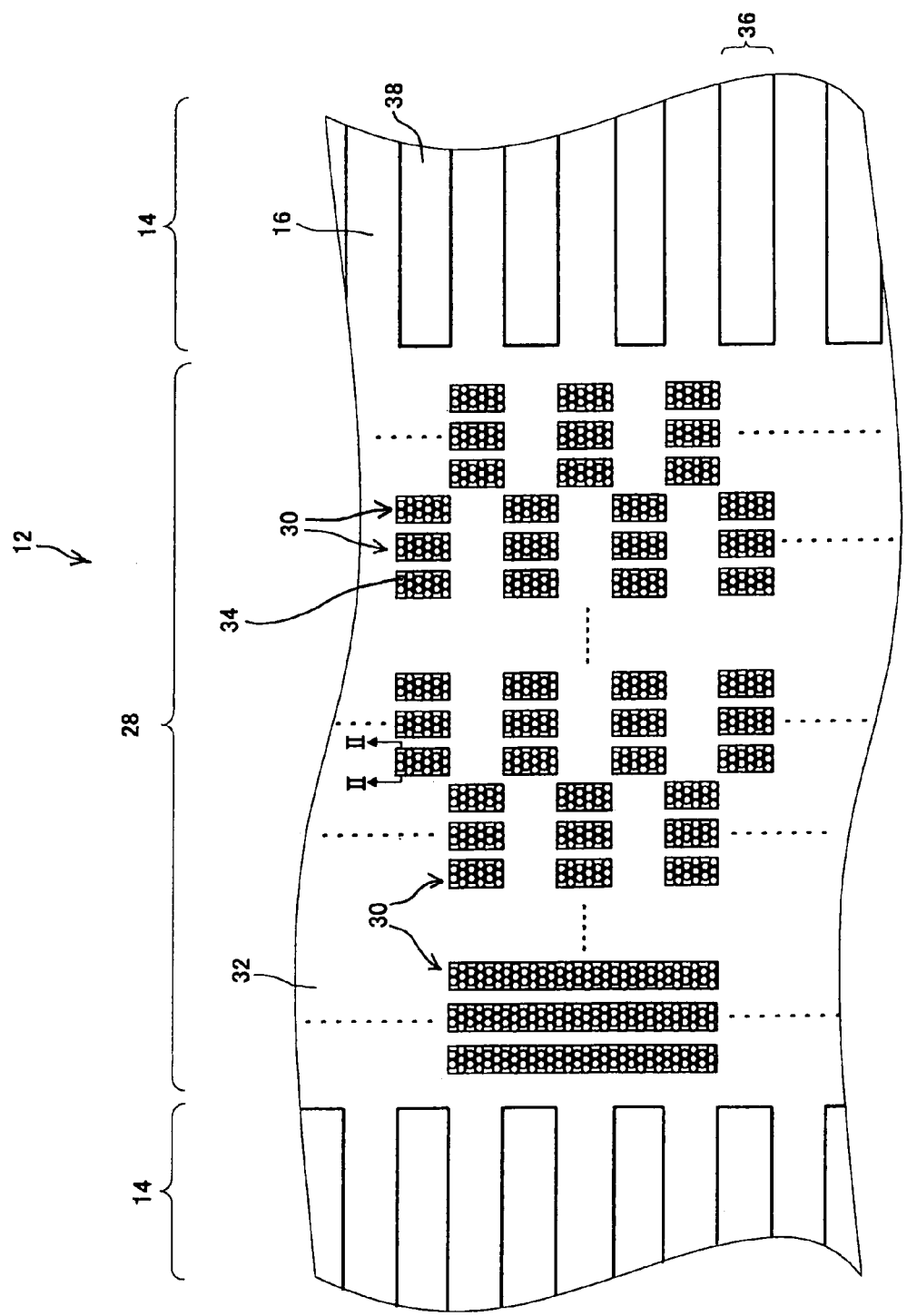
FIG. 1 is a plan view schematically showing the structure of a magnetic recording medium according to an exemplary embodiment of the present invention.
Figure 2:
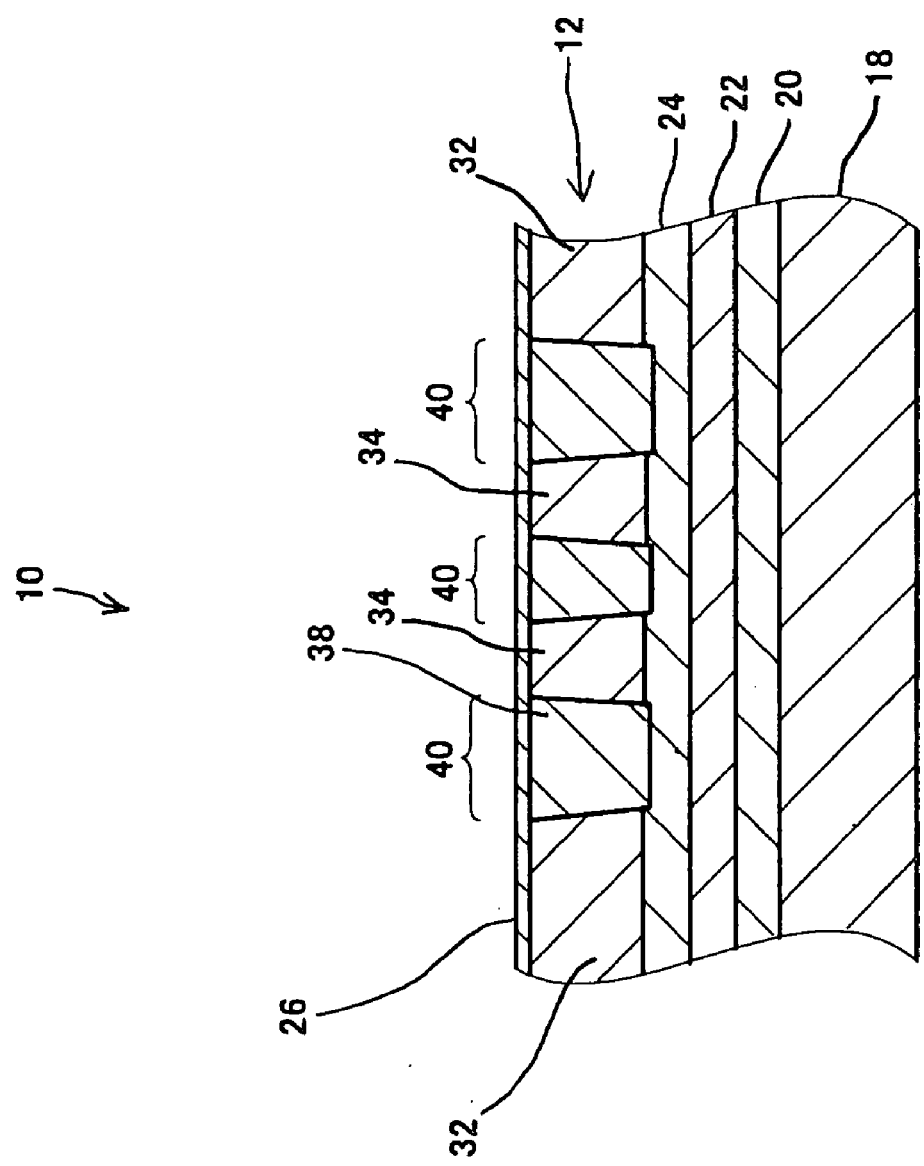
FIG. 2 is a sectional side view taken along the line II-II of FIG. 1.

FIG. 1 is a plan view schematically showing the structure of a magnetic recording medium according to the exemplary embodiment. FIG. 2 is a sectional side view taken along the line II-II of FIG. 1.

A magnetic recording medium 10 is a vertical recording magnetic disc of discrete type, having a magnetic layer 12 which is sectioned into a plurality of data areas 14 and a plurality of servo areas 28 for information recording. In the data areas 14, the magnetic layer 12 is physically separated into a number of recording elements 16. An underlayer 20, a soft magnetic layer 22, a seed layer 24, the magnetic layer 12, and a protective layer 26 are formed on a substrate 18 in this order.

The magnetic recording medium 10 is characterized in that in each of the servo areas 28, the magnetic layer 12 is separated into a plurality of servo pattern unit parts 30 for forming a predetermined servo pattern and a servo pattern peripheral part 32 surrounding the servo pattern unit parts 30, and that the servo pattern unit parts 30 and the servo pattern peripheral part 32 are formed in different sizes so as to have different magnetic properties.

The rest of the configuration is the same as that of conventional magnetic recording media. Description thereof will thus be omitted as appropriate.

Figure 3:
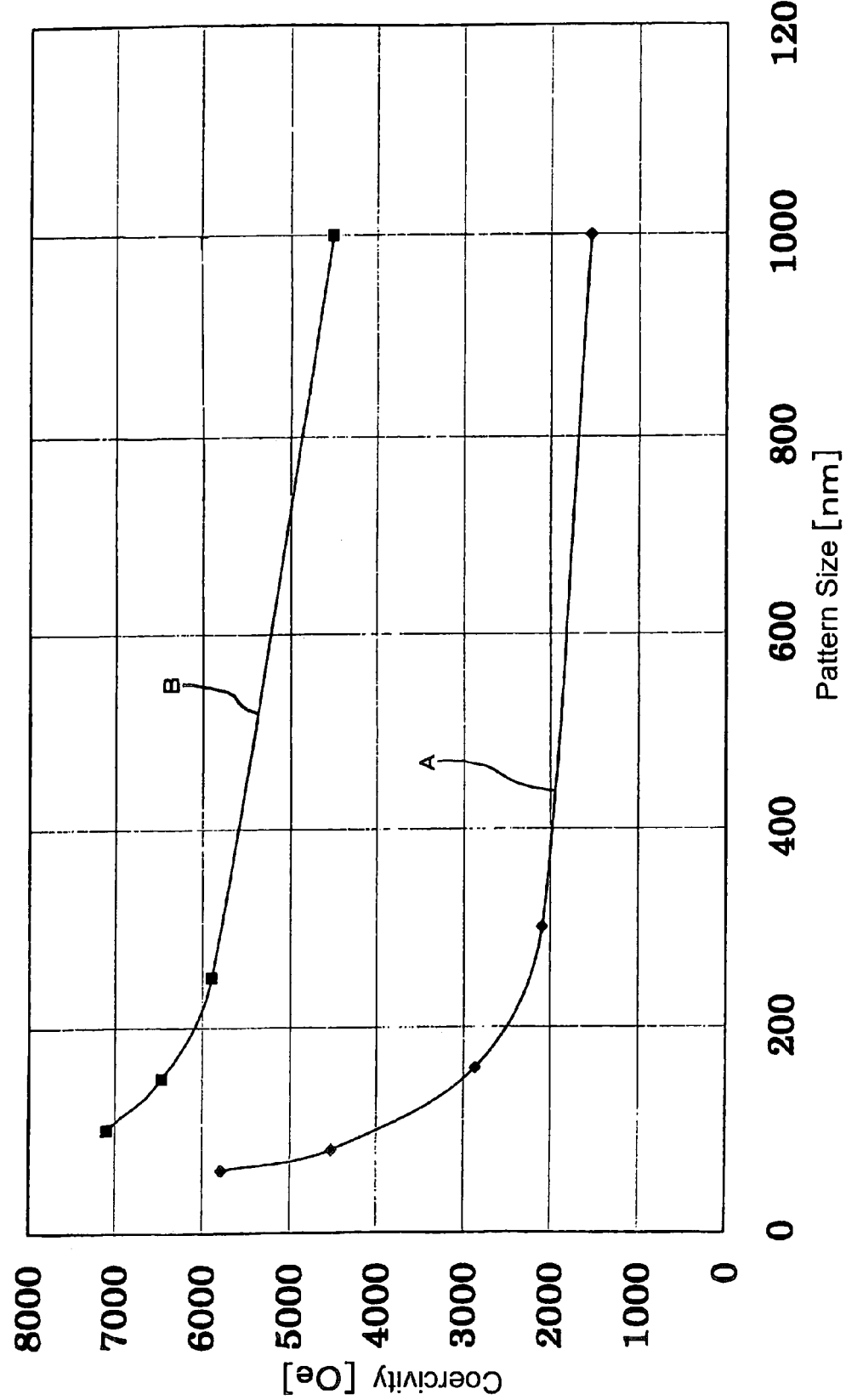
FIG. 3 is a graph showing the relationship between the physical size and coercivity of the magnetic layer of the magnetic recording medium.

The constituents of the magnetic layer 12, i.e., the recording elements 16, the servo pattern unit parts 30, and the servo pattern peripheral part 32 are made of a CoPt (cobalt-platinum) alloy. As shown by the curve designated by the symbol A in FIG. 3, the CoPt alloy has the property of increasing in coercivity with decreasing size, and increasing in coercivity significantly at sizes of 200 nm or below in particular.

The recording elements 16 are arranged in a number of rows concentrically in the data areas 14. Gap portions 36 between the recording elements 16 are filled with a non-magnetic material 38 which is made of $SiO_2$ (silicon dioxide)

The servo pattern unit parts 30 are composed of sets of a plurality of smaller servo pattern unit components 34. Each of the servo pattern unit components 34 is a generally-circular protrusion formed smaller than the servo pattern peripheral part 32, having coercivity higher than that of the servo pattern peripheral part 32.

Meanwhile, only a single, integral servo pattern peripheral part 32 is formed for each servo area 28.

The servo pattern unit parts 30 and the servo pattern peripheral part 32 are magnetized in opposite polarities. Gap portions 40 between the individual servo pattern unit components 34 and the servo pattern peripheral part 32 are also filled with the non-magnetic material 38.

The substrate 18 is made of glass. The underlayer 20 is made of Cr (chromium) or a Cr alloy. The soft magnetic layer 22 is made of an Fe (iron) alloy or a Co (cobalt) alloy. The seed layer 24 is made of CoO, MgO, NiO, or the like. The protective layer 26 is made of DLC (Diamond Like Carbon).

As employed herein, the term DLC refers to a material that consists chiefly of carbon, has an amorphous structure, and exhibits a hardness of the order of 200 to 8000 $kgf/mm^2$ in Vickers hardness tests.

Now, description will be given of the operation of the magnetic recording medium 10.

The magnetic recording medium 10 has the servo pattern unit parts 30 and the surrounding servo pattern peripheral part 32, which are magnetized in opposite polarities. This yields a greater output amplitude with excellent read accuracy of the servo information.

In addition, since the servo pattern unit parts 30 and the servo pattern peripheral part 32 have different coercivities, the magnetic recording medium 10 can be easily magnetized with the servo pattern unit parts 30 and the servo pattern peripheral part 32 in different polarities as will be described later, with excellent recording efficiency of the servo information.

Additionally, the servo pattern unit parts 30 are physically separated into a plurality of servo pattern unit components 34. The individual servo pattern unit components 34 are thus formed accordingly smaller for higher coercivity, allowing greater coercivity differences between the servo pattern unit parts 30 and the servo pattern peripheral part 32. The servo pattern unit parts 30 and the servo pattern peripheral part 32 can thus be magnetized in opposite polarities with facility and reliability.

Moreover, since the recording elements 16, the servo pattern peripheral part 32, and the servo pattern unit parts 30 can be formed simultaneously, the magnetic recording medium 10 of the present embodiment is high in production efficiency.

Note that the magnetic recording medium 10 is flat at the surface and has a stable head flying height since the gap portions 36 between the recording elements 16 and the gap portions 40 between the servo pattern unit parts 30 and the servo pattern peripheral part 32 are filled with the non-magnetic material 38.

Next, an exemplary embodiment of a method of manufacturing the magnetic recording medium 10 will be described.

Figure 4:
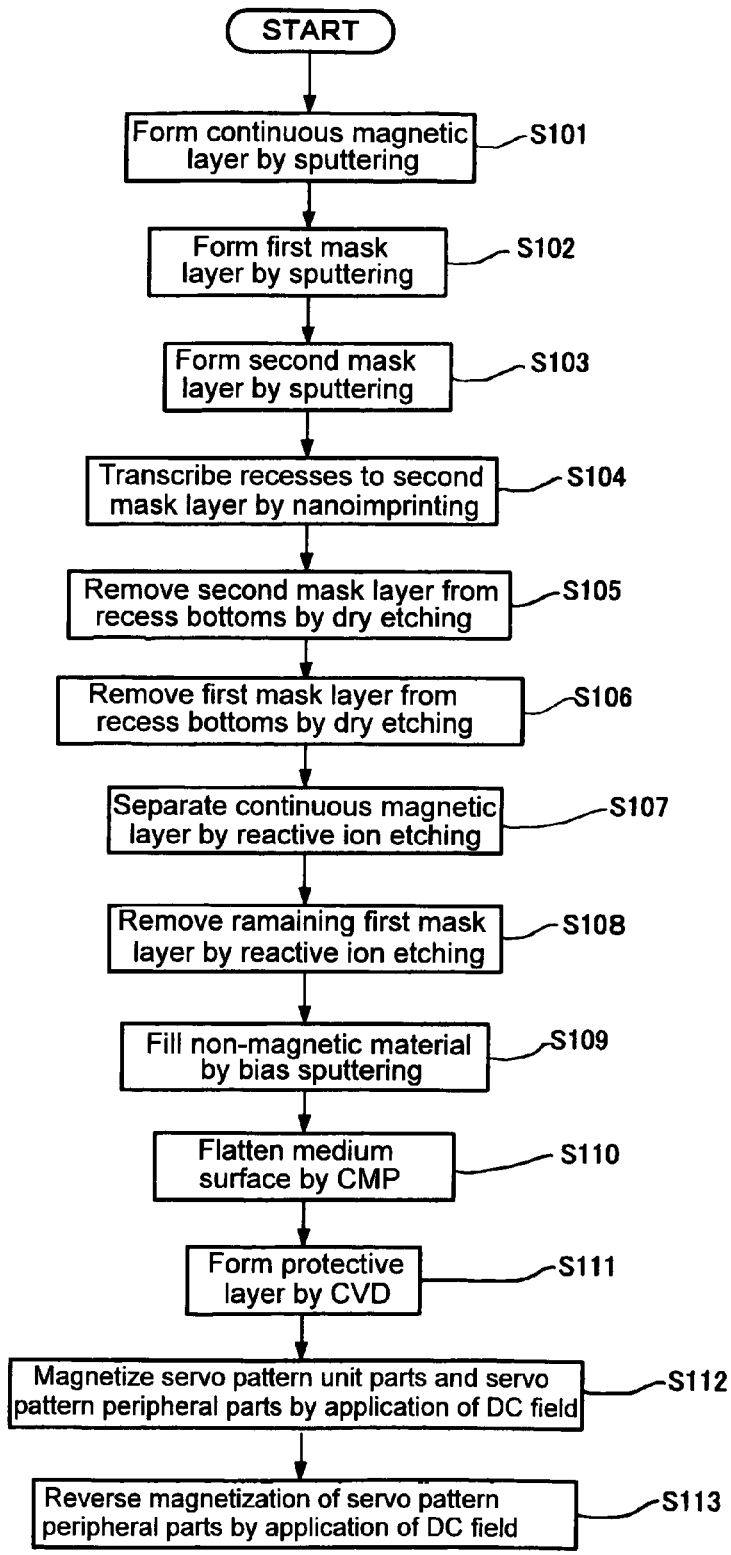
FIG. 4 is a flowchart showing the steps of manufacturing the magnetic recording medium.

FIG. 4 is a flowchart outlining manufacturing the magnetic recording medium 10.

Figure 5:
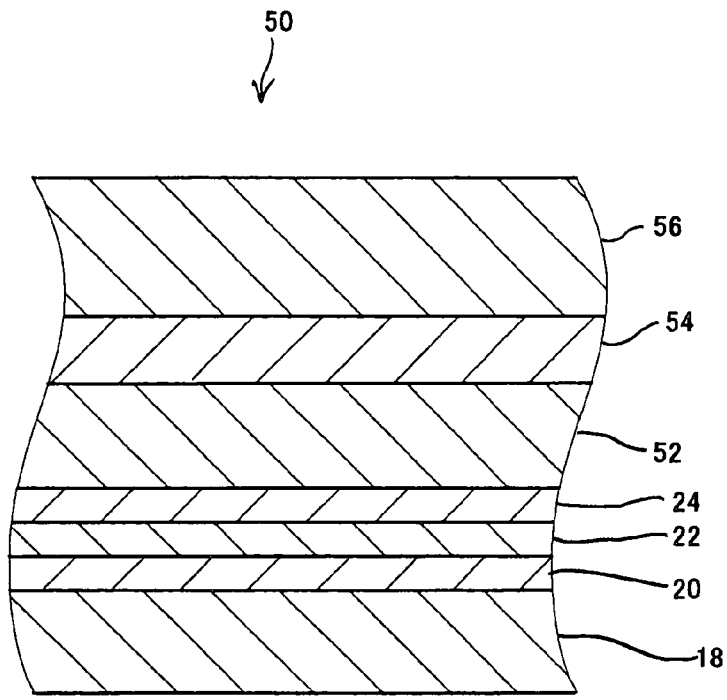
FIG. 5 is a sectional side view schematically showing the structure of a starting material in the process of manufacturing the magnetic recording medium.

Initially, a starting material 50 such as shown in FIG. 5 is prepared for the manufacturing process. This starting material 50 is produced by sputtering an underlayer 20 of 300 to 2000 Å in thickness, a soft magnetic layer 22 of 500 to 3000 Å in thickness, an seed layer 24 of 30 to 300 Å in thickness, and a continuous magnetic layer 52 of 100 to 300 Å in thickness on a substrate 18 in this order (S101). Moreover, a first mask layer 54 is sputtered to a thickness of 100 to 500 Å on the continuous magnetic layer 52 (S102). A second mask layer 56 of 300 to 3000 Å in thickness is then formed by spin coating or dipping (S103), followed by baking.

Incidentally, the first mask layer 54 is made of TiN (titanium nitride), and the second mask layer 56 is made of a negative type resist (NEB22A from Sumitomo Chemical Co., Ltd.)

Figure 6:
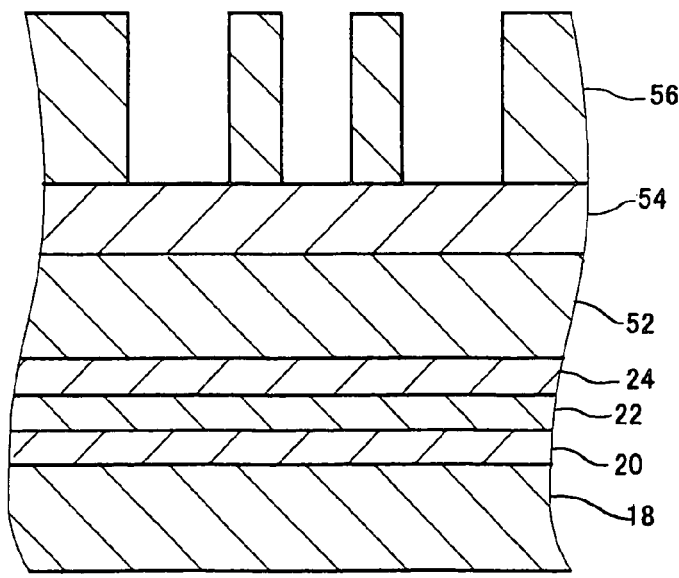
FIG. 6 is a sectional side view schematically showing the step of processing a second mask layer of the starting material.

Onto the second mask layer 56 of the starting material 50 obtained thus, recesses corresponding to the isolation pattern of the recording elements 16 in the data areas 14 and the isolation pattern of the servo pattern unit parts 30 and servo pattern peripheral part 32 in the servo areas 28 are transcribed by nanoimprinting (S104) using transcribing means (not shown). Then, the entire surface of the second mask layer 56 is dry etched with an oxygen- or ozone-gas-based plasma uniformly, so that the second mask layer 56 is removed from the recess bottoms as shown in FIG. 6 (S105) to expose the first mask layer 54 at the recess bottoms. Note that the dry etching also removes the second mask layer 56 at regions other than the recesses, whereas the second mask layer 56 remains as much as the difference in level from the recess bottoms.

Figure 7:
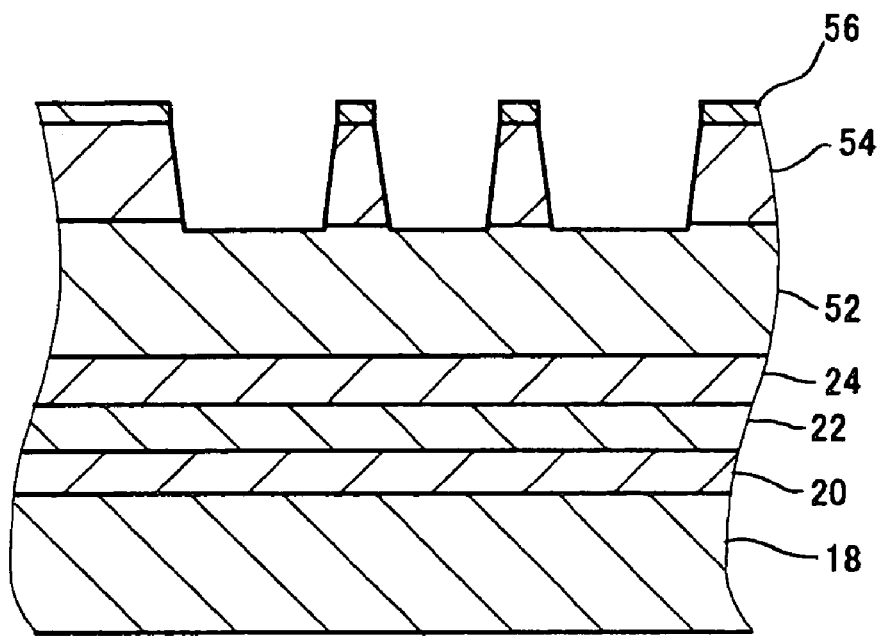
FIG. 7 is a sectional side view schematically showing the step of processing a first mask layer of the starting material.

Next, the first mask layer 54 is removed from the recess bottoms as shown in FIG. 7 (S106) by reactive ion etching using $CF_4$ (carbon tetrafluoride) gas or $SF_6$ (sulfur hexafluoride) gas as the reactive gas. Here, a small amount of the continuous magnetic layer 52 is also removed. Moreover, the second mask layer 56 is largely removed from the regions other than the recesses, but remains slightly.

Figure 8:
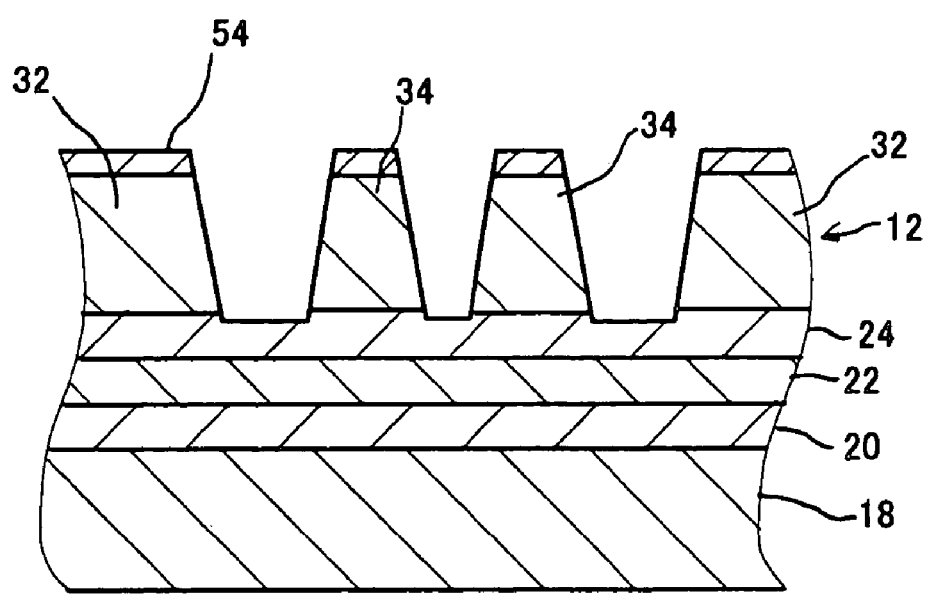
FIG. 8 is a sectional side view schematically showing the step of processing a magnetic layer of the starting material.

Next, the continuous magnetic layer 52 is removed from the recess bottoms as shown in FIG. 8 by reactive ion etching using a mixed gas of $NH_3$ (ammonia) gas and CO (carbon monoxide) gas as the reactive gas. This separates the continuous magnetic layer 52 into a number of fine recording elements 16 in the data areas 14, and into the servo pattern unit parts 30 and the servo pattern peripheral part 32 in the servo areas 28. At the same time, the continuous magnetic layer 52 in each servo pattern unit part 30 is physically separated into a plurality of servo pattern unit components 34 (S107). Here, a small amount of the seed layer 24 is also removed from the recess bottoms. While the second mask layer 56 is removed from the regions other than the recesses completely, the first mask layer 54 remains slightly on the recording elements 16, the servo pattern unit parts 30, and the servo pattern peripheral part 32 in the regions other than the recesses.

Figure 9:
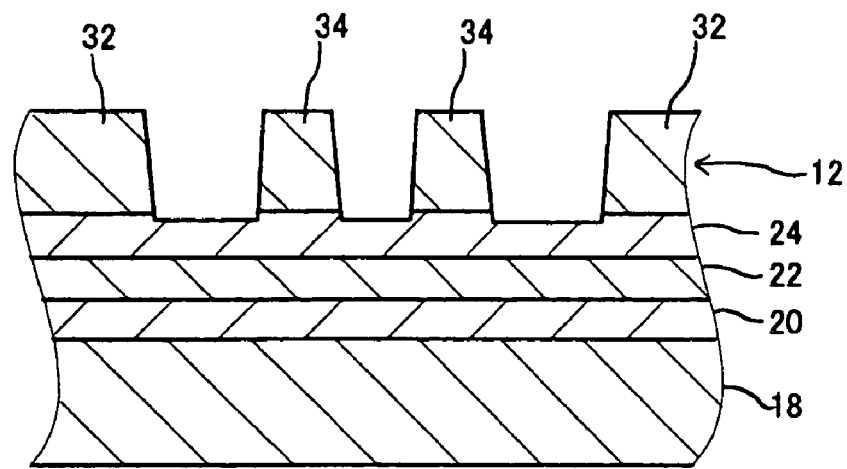
FIG. 9 is a sectional side view schematically showing the step of removing the first mask layer of the starting material.

This remaining first mask layer 54 is completely removed as shown in FIG. 9 (S108) by reactive ion etching using $CF_4$ gas or $SF_6$ gas as the reactive gas.

Figure 10:
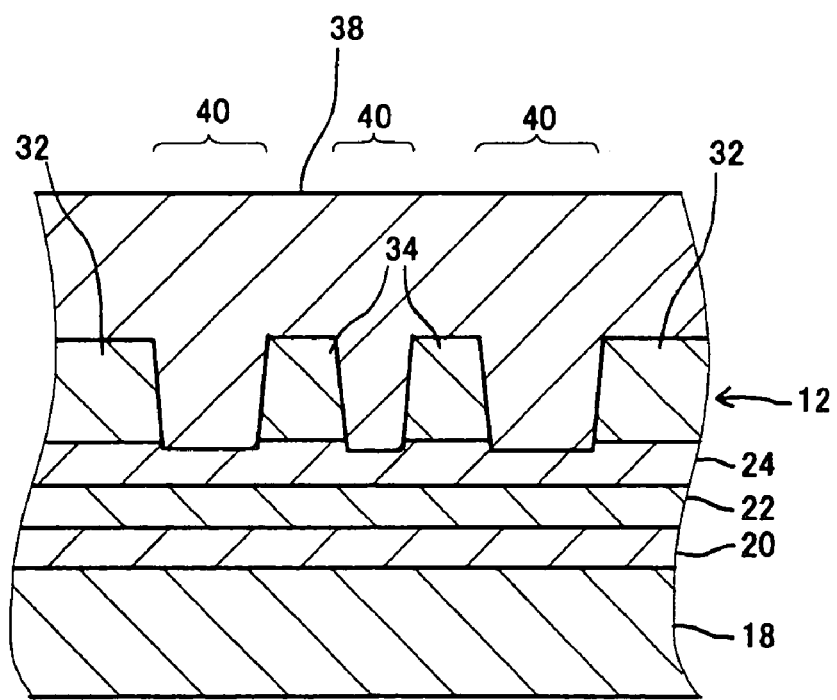
FIG. 10 is a sectional side view schematically showing the step of filling the starting material with a non-magnetic material.

Next, as shown in FIG. 10, the gap portions 36 between the recording elements 16 in the data areas 14 and the gap portions 40 between the servo pattern unit parts 30 and servo pattern peripheral part 32 in the servo areas 28 are filled with the non-magnetic material 38 by bias sputtering (S109). Here, the non-magnetic material 38 is formed so as to cover the recording elements 16, the servo pattern unit parts 30, and the servo pattern peripheral part 32 completely.

Figure 11:
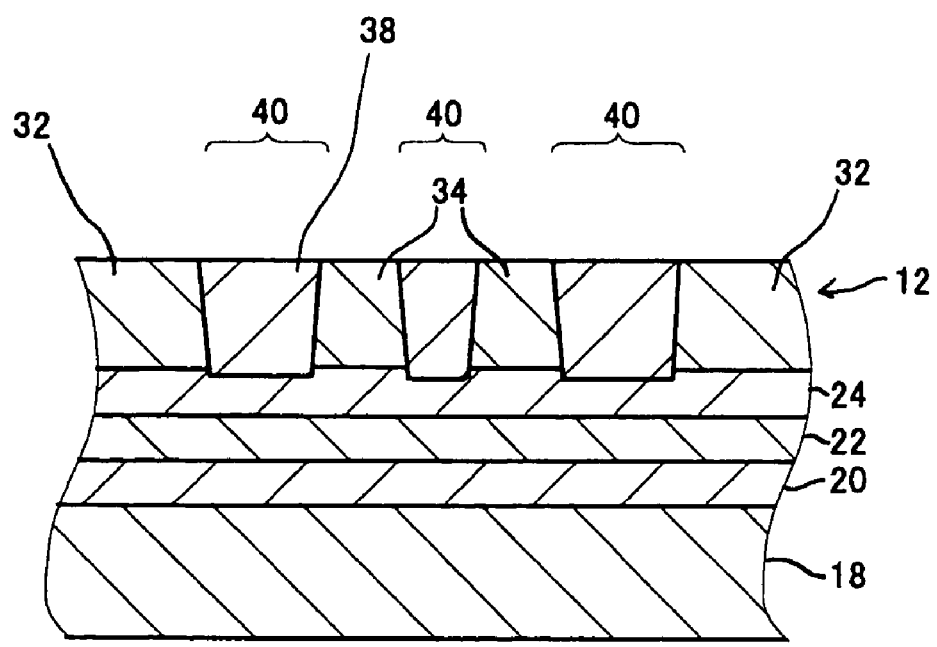
FIG. 11 is a sectional side view schematically showing the step of flattening the starting material.

Next, as shown in FIG. 11, an excess of the non-magnetic material 38 is removed by CMP to flatten the surface (S110).

Moreover, a protective layer 26 is formed over the flattened surface by CVD (S111), thereby obtaining the magnetic recording medium 10 as shown in FIGS. 1 and 2 seen above.

Incidentally, if necessary, a lubrication layer of, e.g., PFPE (perfluoropolyether) is applied to a thickness of 10 to 20 Å on the surface of the protective layer 26 by dipping.

Now, description will be given of the method of recording servo information on the magnetic recording medium 10.

Initially, as schematically shown in FIG. 12, a uniform direct-current external magnetic field higher than the coercivities of both the servo pattern unit components 34 and the servo pattern peripheral part 32 is applied to the magnetic recording medium 10, so that the servo pattern unit components 34 and the servo pattern peripheral part 32 are magnetized in the same polarity (S112).

Next, a direct-current external magnetic field lower than the coercivity of the servo pattern unit components 34 and higher than the coercivity of the servo pattern peripheral part 32 is applied in the direction opposite to that of the foregoing external magnetic field as shown in FIG. 13, whereby the servo pattern peripheral part 32 are magnetized in the reverse polarity (S113). Here, the servo pattern unit components 34 will not be reversed in the polarity of magnetization. That is, the servo pattern unit parts 30 and the servo pattern peripheral part 32 are magnetized in opposite directions, and the recording of the servo information completes.

As above, the servo information can be recorded easily by applying the uniform direct-current external magnetic fields in two steps. The method of manufacturing the magnetic recording medium according to the exemplary embodiment is thus high in production efficiency.

In addition, the step of separating the servo areas 28 of the magnetic layer 12 into the servo pattern unit parts 30 and the servo pattern peripheral part 32 is performed simultaneously with the step of separating the data areas 14 of the magnetic layer 12 into a number of recording elements 16. Thus, even in this respect, the method of manufacturing the magnetic recording medium according to the exemplary embodiment can be said to have a high production efficiency.

While the exemplary embodiment uses a CoPt alloy as the material of the magnetic layer 12, the magnetic layer 12 may be made of other materials such as a Co (cobalt) alloy, a lamination of Co and Pd (palladium), a lamination of Co and Pt (platinum), Fe (iron), an Fe alloy, and a lamination of Fe alloys. With the lamination of Co and Pd, the physical size and the coercivity have the relationship shown by the curve designated by the symbol B in FIG. 3.

In the exemplary embodiment, the magnetic recording medium 10 has the servo pattern unit parts 30 that consist of a plurality of servo pattern unit components 34 of generally circular shape, arranged in such a pattern as shown in FIG. 1. However, the servo pattern unit components are not limited to any particular shape, numbers of arrangement, or pattern of arrangement as long as the servo pattern unit parts 30 and the servo pattern peripheral part 32 are distinguishable magnetically.

In the exemplary embodiment, the magnetic recording medium 10 is configured so that the servo pattern unit parts 30 are separated into a plurality of servo pattern unit components 34. However, servo pattern unit parts may be composed of a single magnetic element each, as long as the servo pattern unit parts 30 and the servo pattern peripheral part 32 are distinguishable magnetically.

In the exemplary embodiment, the magnetic recording medium 10 has the servo pattern unit parts 30 that are formed smaller than the servo pattern peripheral part 32. However, for example, each of the servo pattern unit parts may be formed integrally while the servo pattern peripheral part is constituted as sets of a plurality of servo pattern peripheral elements which are formed smaller than the servo pattern unit parts.

In the exemplary embodiment, the magnetic recording medium 10 has the servo pattern unit parts 30 and the servo pattern peripheral part 32 that differ in coercivity and are magnetized in opposite polarities. However, the servo-pattern unit parts and the servo pattern peripheral parts may be formed in different sizes so that they differ in other magnetic properties such as magnetic anisotropy and residual magnetization. In this case, the two portions are distinguished based on the differences in these magnetic properties.

In the exemplary embodiment, the magnetic recording medium 10 has the non-magnetic material 38 which is filled into the gap portions 36 between the recording elements 16, and the gap portions 40 between the servo pattern unit parts 30 and the servo pattern peripheral part 32. However, the gap portions 36 and 40 need not necessarily be filled with a non-magnetic material as long as stable head flying is achieved. Whether or not to fill the gap portions with a non-magnetic material may be determined as appropriate in consideration of such factors as head flying stability and production efficiency based on the sizes of the gap portions, the type of the head, etc. In case that the step of filling the non-magnetic material is omitted, the production efficiency can improve further. Incidentally, if the gap portions are not filled with the non-magnetic material, a protective layer is preferably formed even over the gap portions at the time of forming the protective layer over the magnetic layer after the separation and processing of the magnetic layer.

In the exemplary embodiment, the magnetic recording medium 10 is a vertical recording magnetic disc of discrete type in which the data areas 14 have a number of recording elements 16 radially arranged in rows. However, it is obvious that the present invention is applicable to manufacturing magnetic discs that have recording elements arranged at fine spacings in the circumferential direction of the tracks (sector direction), and magnetic discs that have recording elements arranged at fine spacings both in the radial directions and circumferential direction of the tracks. The present invention is also applicable to manufacturing other magnetic recording media including magneto-optical discs such as an MO.

Moreover, the invention is also applicable to a magnetic recording medium that has a continuous magnetic layer in the data areas. Here, servo areas can be separated into servo pattern unit parts and servo pattern peripheral parts, with the effect of significant improvement in the recording efficiency of the servo information.

The exemplary embodiment has dealt with the case where the first mask layer 54 is made of TiN. Nevertheless, the first mask layer 54 is not limited to any particular material but has only to be less prone to removal by reactive ion etching that uses CO gas or the like as the reactive gas. For example, Ti (titanium), Ta (tantalum), Mg (magnesium), Al (aluminum), Si (silicon), Ge (germanium), Pb (lead), and alloys and compounds consisting mostly of the same may be used.

The exemplary embodiment has dealt with the case where the second mask layer 56, a negative type resist, is formed over the first mask layer 54 for the sake of dry etching the first mask layer 54 to a predetermined pattern, and the first mask layer 54 is processed into the predetermined pattern by two steps of dry etching. However, the other layers to be formed on the first mask layer 54 are not limited to any particular material, number of layers, etc., as long as the first mask layer 54 can be processed to a predetermined pattern. For example, the first mask layer 54 may be processed into a predetermined pattern by three or more steps of dry etching.

In the exemplary embodiment, the first mask layer 54 is processed by reactive ion etching using $CF_4$ or $SF_6$ as the reactive gas. However, the reactive gas is not limited to any particular type as long as it reacts with the material of the first mask layer 54 as described above for etching promotion. For example, other fluorine-based gases such as $NF_3$ and $CHF_3$, and chlorine-based gases such as $Cl_2$, $BCl_3$, and $CHCl_3$ may be used.

While the exemplary embodiment uses bias sputtering to fill the non-magnetic material 38, the non-magnetic material may be filled by plasma CVD with bias application.

While the exemplary embodiment uses CMP to remove an excess of the non-magnetic material 38 for surface flattening, for example, plasma dry processes such as ion beam etching, ion milling, and reactive ion etching may be used to remove the excess of the non-magnetic material 38 for flattening.

EXAMPLE

A magnetic recording medium 10 was fabricated according to the foregoing exemplary embodiment. The servo pattern unit components 34 were formed in a generally circular shape of approximately 50 to 60 nm in diameter.

Figure 14:
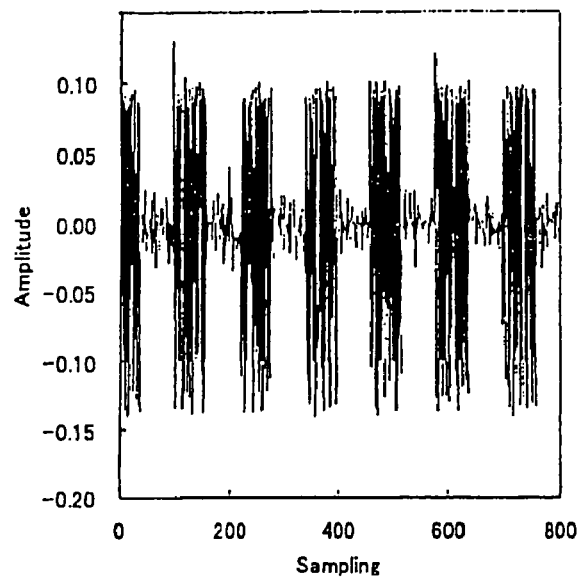
FIG. 14 is a graph showing the electromagnetic conversion characteristic of the magnetic recording medium according to a example of the present invention.

The magnetic recording medium 10 was measured for electromagnetic conversion characteristic, and showed the waveform shown in FIG. 14.

Comparative Example

In contrast to the foregoing exemplary embodiment, the servo areas 28 were not provided with the servo pattern unit parts 30 but the servo pattern peripheral part 32 alone. That is, a comparative sample recessed at positions corresponding to the servo pattern unit parts 30, without the magnetic elements there was fabricated.

Figure 15:
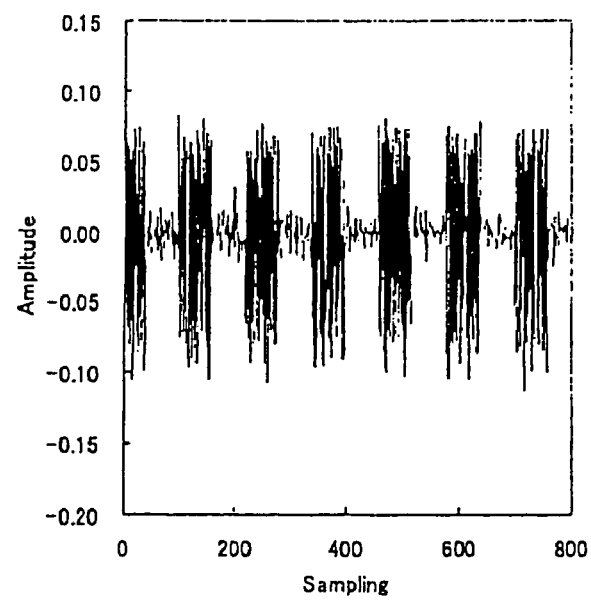
FIG. 15 is a graph showing the electromagnetic conversion characteristic of a comparative sample.

This comparative sample was measured for electromagnetic conversion characteristic, and showed the waveform shown in FIG. 15.

From FIGS. 14 and 15, it was confirmed that the example showed a significant increase in output amplitude as compared to the comparative example.

As has been described, according to the exemplary embodiments of the present invention, it is possible to provide the excellent effect of achieving a magnetic recording medium on which servo information is recorded effectively with a sufficient output amplitude for favorable read accuracy of the servo information.

What is claimed is:

1. A magnetic recording medium comprising a magnetic layer which is sectioned into a plurality of data areas and a plurality of servo areas for information recording, wherein:

in each of the servo areas, the magnetic layer is separated into a plurality of servo pattern unit parts forming a predetermined servo pattern and a servo pattern peripheral part surrounding the servo pattern unit parts;

each of the servo areas has only a single, integral servo pattern peripheral part;

the servo pattern peripheral part is composed of a single magnetic element;

each of the servo pattern unit parts includes a set of a plurality of servo pattern unit components;

the servo pattern unit components and the servo pattern peripheral part are made of same material and have essentially same thickness;

the servo pattern unit components are smaller than the servo pattern peripheral part in a plan view showing a flat surface of the medium; and the servo pattern unit components and the servo pattern peripheral part are formed in different sizes so as to have different magnetic properties.

2. The magnetic recording medium according to claim 1, wherein the servo pattern unit components and the servo pattern peripheral part are formed in different sizes so as to have different coercivities as the magnetic properties.

3. The magnetic recording medium according to claim 2, wherein the servo pattern unit components and the servo pattern peripheral part are magnetized in opposite polarities.

4. The magnetic recording medium according to claim 1, wherein
the servo pattern unit components and the servo pattern peripheral part are formed in different sizes so as to have different magnetic anisotropies as the magnetic properties.

5. The magnetic recording medium according to claim 1, wherein
the servo pattern unit components and the servo pattern peripheral part are formed in different sizes so as to have different residual magnetizations as the magnetic properties.

6. The magnetic recording medium according to claim 1, wherein
in each of the data areas, the magnetic layer is physically separated into a number of recording elements.

7. A magnetic recording medium comprising a magnetic layer which is sectioned into a plurality of data areas and a plurality of servo areas for information recording, wherein:
in each of the servo areas, the magnetic layer is separated into a plurality of servo pattern unit parts forming a predetermined servo pattern and a servo pattern peripheral part surrounding the servo pattern unit parts;
each of the servo pattern unit parts are composed of a single magnetic element;
the servo pattern peripheral part includes a set of a plurality of servo pattern peripheral elements; and
the servo pattern unit parts and the servo pattern peripheral elements are formed in different sizes so as to have different magnetic properties.

8. The magnetic recording medium according to claim 7, wherein
the servo pattern unit parts and the servo pattern peripheral elements are formed in different sizes so as to have different coercivities as the magnetic properties.

9. The magnetic recording medium according to claim 8, wherein
the servo pattern unit parts and the servo pattern peripheral elements are magnetized in opposite polarities.

10. The magnetic recording medium according to claim 7, wherein
the servo pattern unit parts and the servo pattern peripheral elements are formed in different sizes so as to have different magnetic anisotropies as the magnetic properties.

11. The magnetic recording medium according to claim 7, wherein
the servo pattern unit parts and the servo pattern peripheral elements are formed in different sizes so as to have different residual magnetizations as the magnetic properties.

12. The magnetic recording medium according to claim 7, wherein
in each of the data areas, the magnetic layer is physically separated into a number of recording elements.

13. The magnetic recording medium according to claim 7, wherein
the servo pattern unit parts and the servo pattern peripheral elements are made of same material and have essentially same thickness; and
the servo pattern unit parts are larger than the servo pattern peripheral elements in a plan view showing a flat surface of the medium.

14. A magnetic recording medium comprising a magnetic layer which is sectioned into a plurality of data areas and a plurality of servo areas for information recording, wherein:
in each of the servo areas, the magnetic layer is separated into a plurality of servo pattern unit parts forming a predetermined servo pattern and a servo pattern peripheral part surrounding the servo pattern unit parts;
each of the servo areas has only a single, integral servo pattern peripheral part;
the servo pattern peripheral part is composed of a single magnetic element;
each of the servo pattern unit parts includes a set of a plurality of servo pattern unit components; and
the servo pattern unit components and the servo pattern peripheral part are formed in different sizes so as to have different magnetic anisotropies.

15. The magnetic recording medium according to claim 14, wherein:
in each of the data areas, the magnetic layer is physically separated into a number of recording elements.

16. The magnetic recording medium according to claim 14, wherein:
the servo pattern unit components and the servo pattern peripheral part are magnetized in opposite polarities.

* * * * *